L. Y. SQUIBB.
AUTOMATIC TALKING MACHINE.
APPLICATION FILED SEPT. 15, 1917.

1,433,103.

Patented Oct. 24, 1922.
8 SHEETS—SHEET 3.

INVENTOR
Lloyd Y. Squibb.

WITNESS

BY

ATTORNEYS

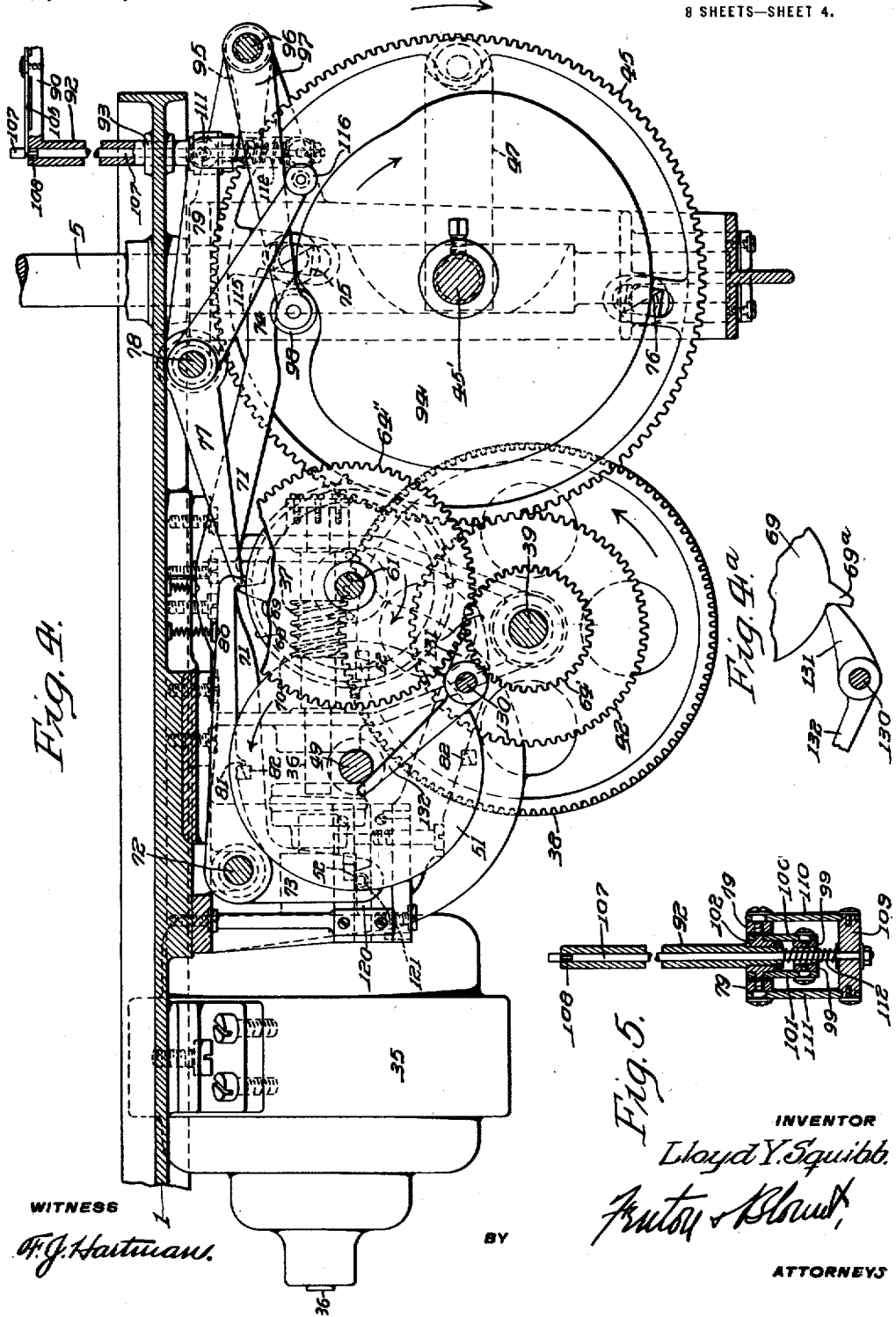

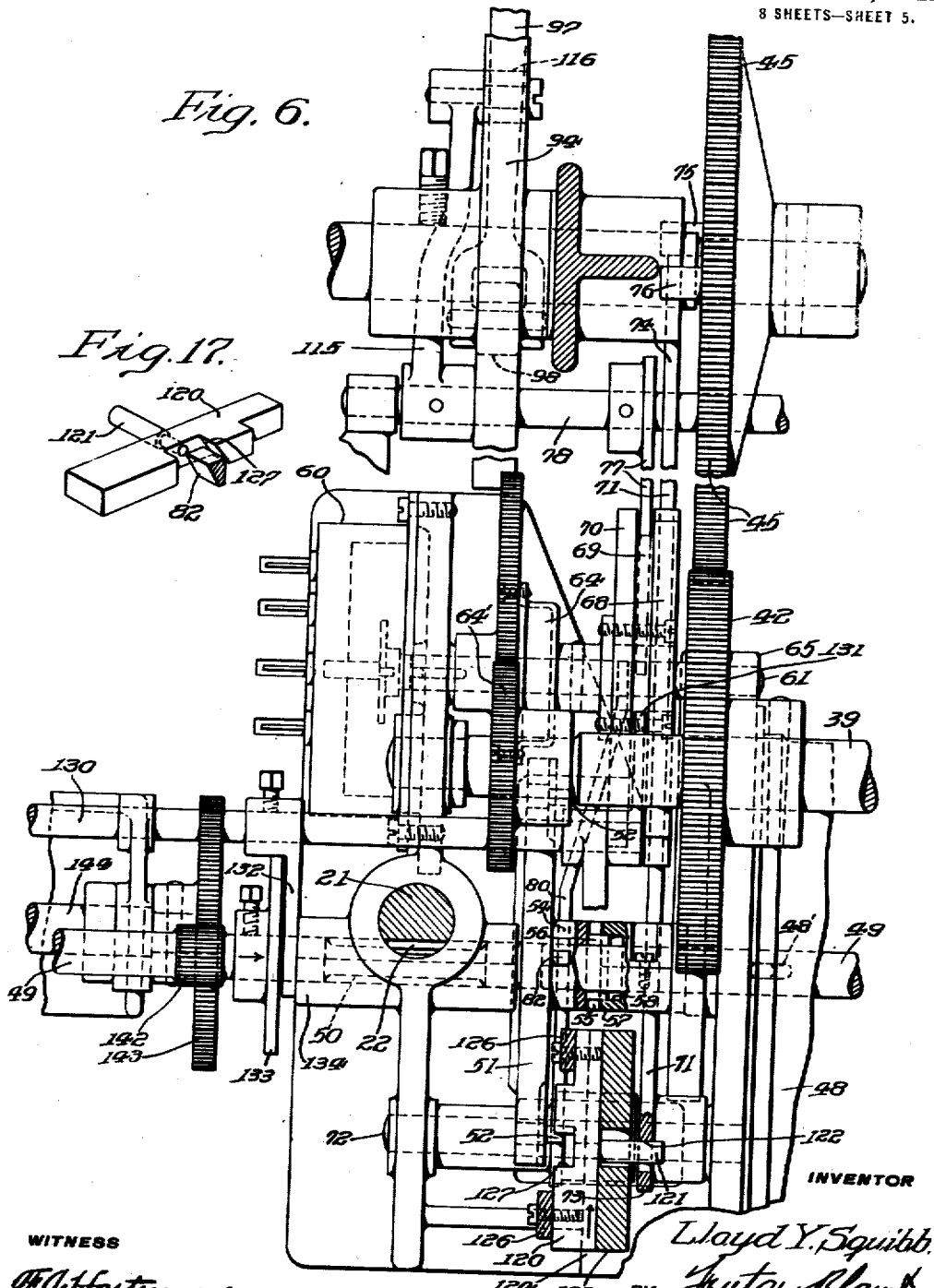

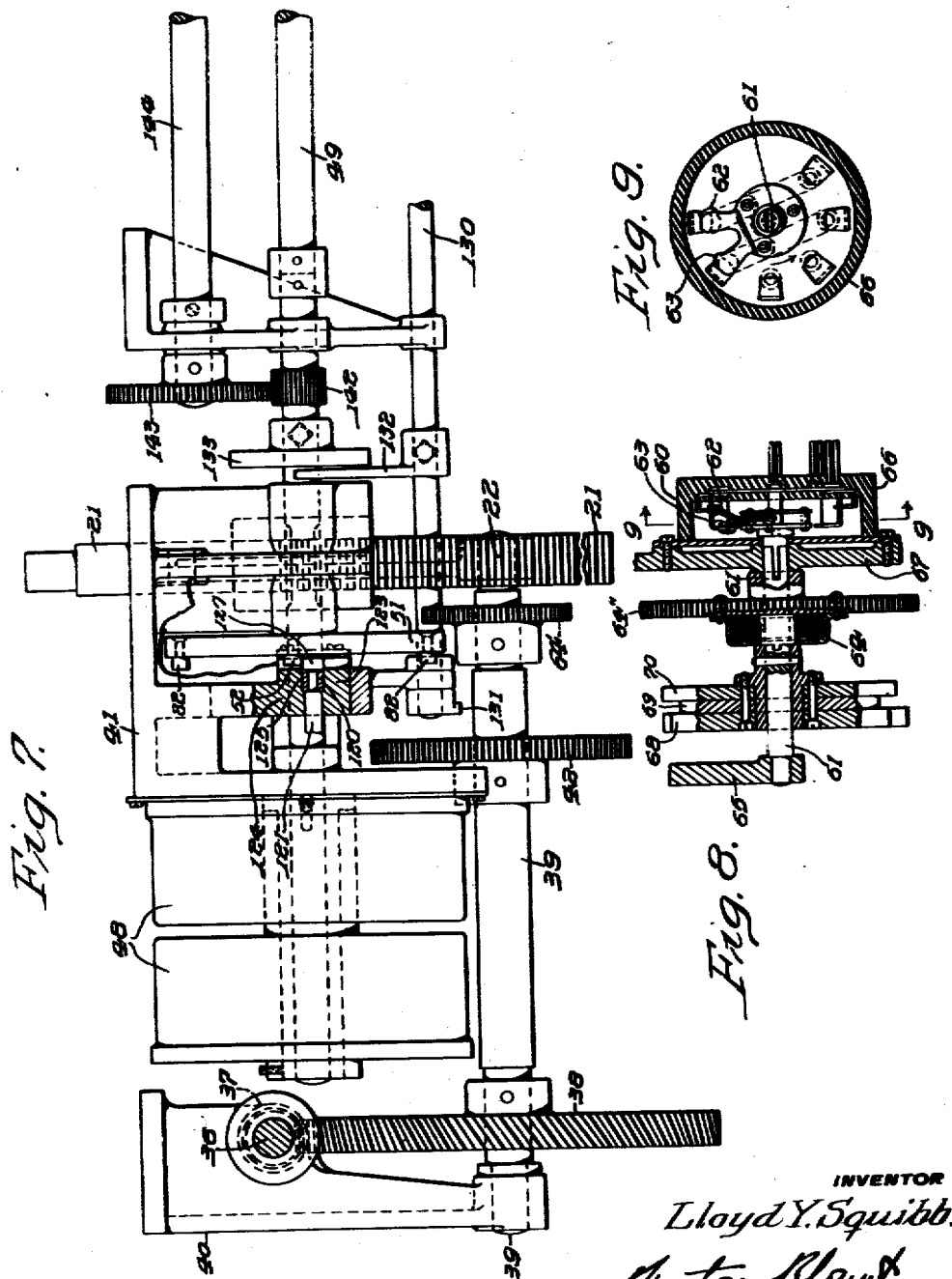

L. Y. SQUIBB.
AUTOMATIC TALKING MACHINE.
APPLICATION FILED SEPT. 15, 1917.

1,433,103.

Patented Oct. 24, 1922.
8 SHEETS—SHEET 7.

INVENTOR
Lloyd Y. Squibb.

WITNESS
F. J. Hartman.

BY
Fenton Blant
ATTORNEYS

Figure 1:
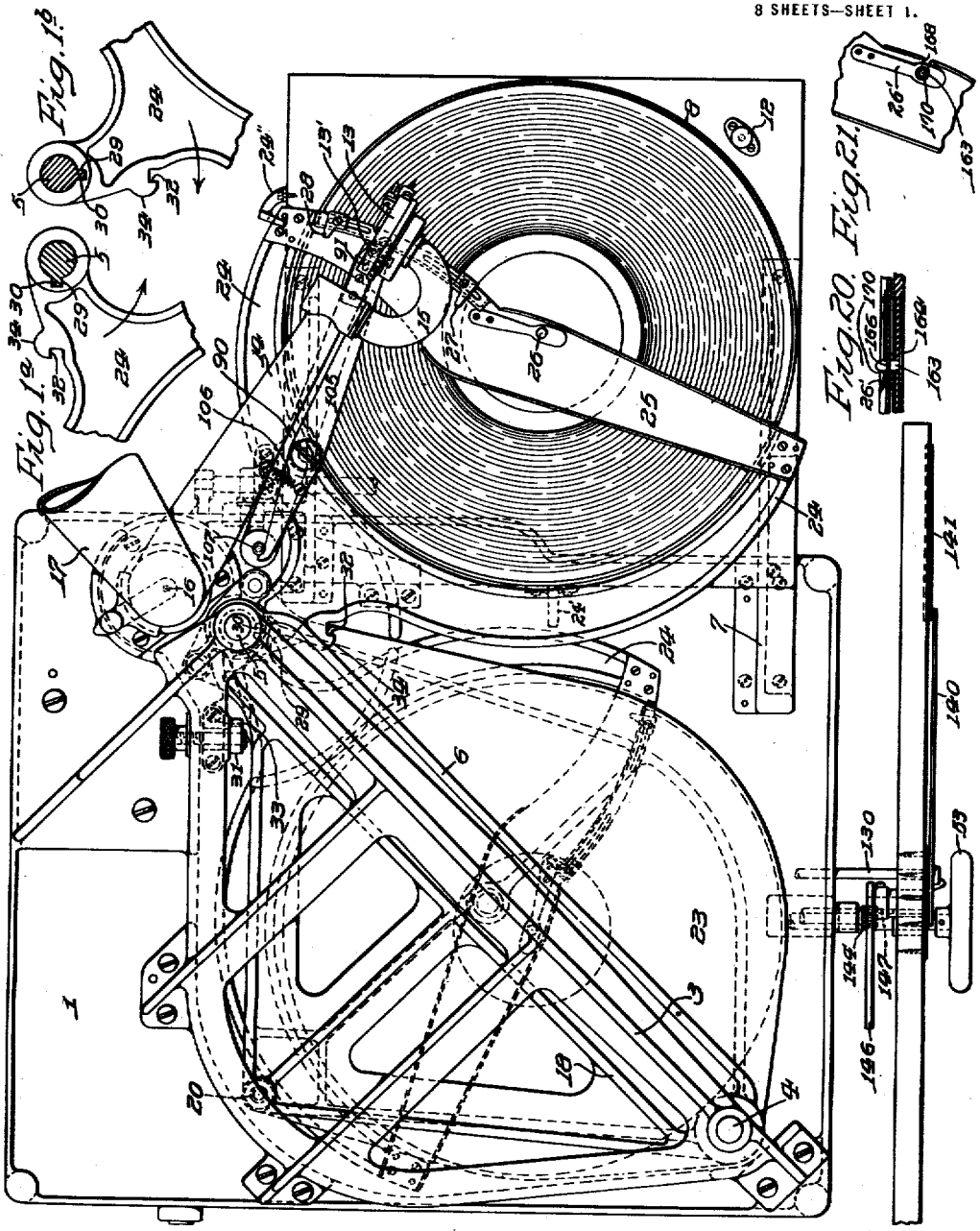

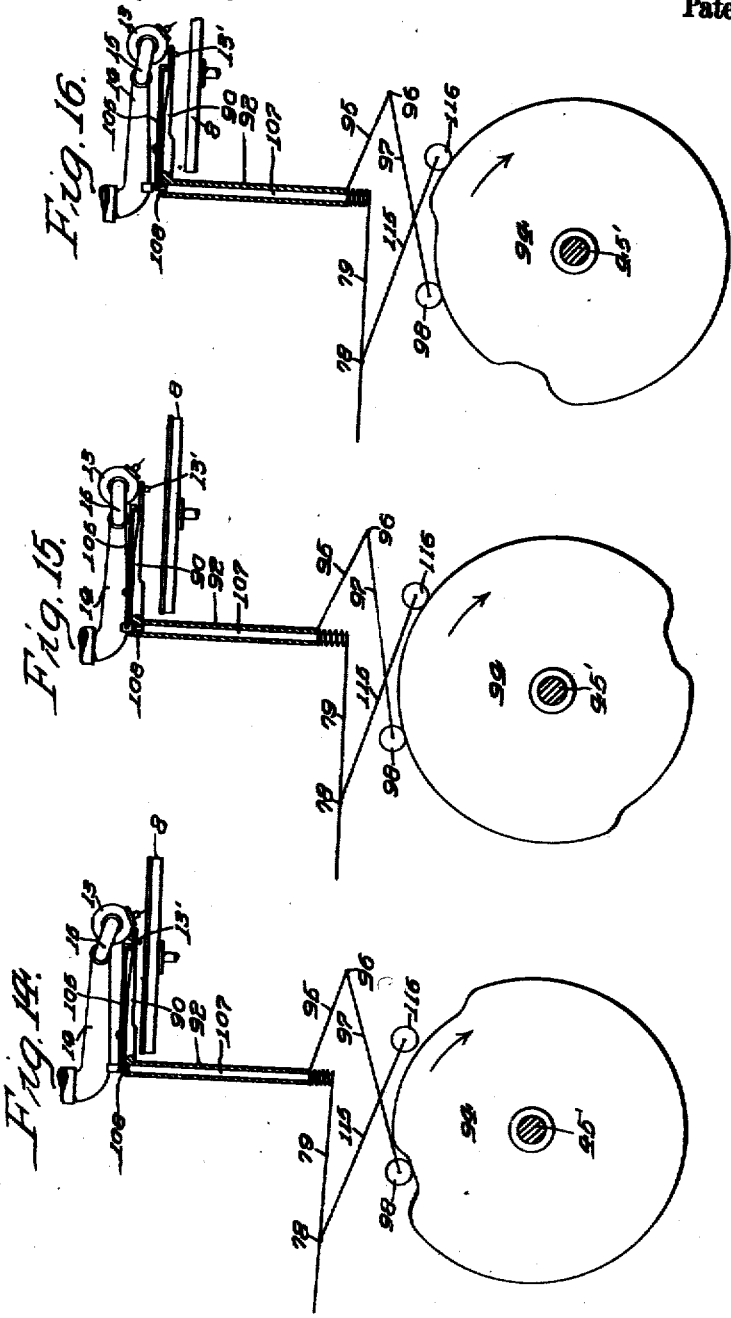

justable means for the different sized records which is readily adapted to cooperate with the other elements of the machine to form an efficiently operating mechanism for automatically playing the various records in series regardless of a variation in the length of each record. One form of carrier for transferring a record from the magazine 6 to the turntable 8 comprises a pivoted curved frame 24 adapted to swing horizontally through an arc of about 90 degrees and thereby shift a record from and to the magazine. A convenient pivot for the carrier 24 is on the main upright post 5 which may be of a peculiar construction and form the means for swinging the carriers in a manner hereinafter set forth. The curved member 24 may be provided with a bridge 25 extending across the ends thereof as shown in Fig. 1 which is provided with suitable means, as a spring pressed finger 26, having a projection adapted to engage with the usual central opening of a record to retain and center the same to the carrier 24. The bridge 25 also forms a convenient support for two adjustable actuating members 27 and 28 for setting in operation parts of the mechanism as will hereinafter appear and which in the present case are shown as suitably constructed detents which are secured on the bridge 25 adjacent the inner and outer edge of the sound record grooves of each record and which may be adjusted for the different sized records placed in the different carriers 24.

Figure 2:
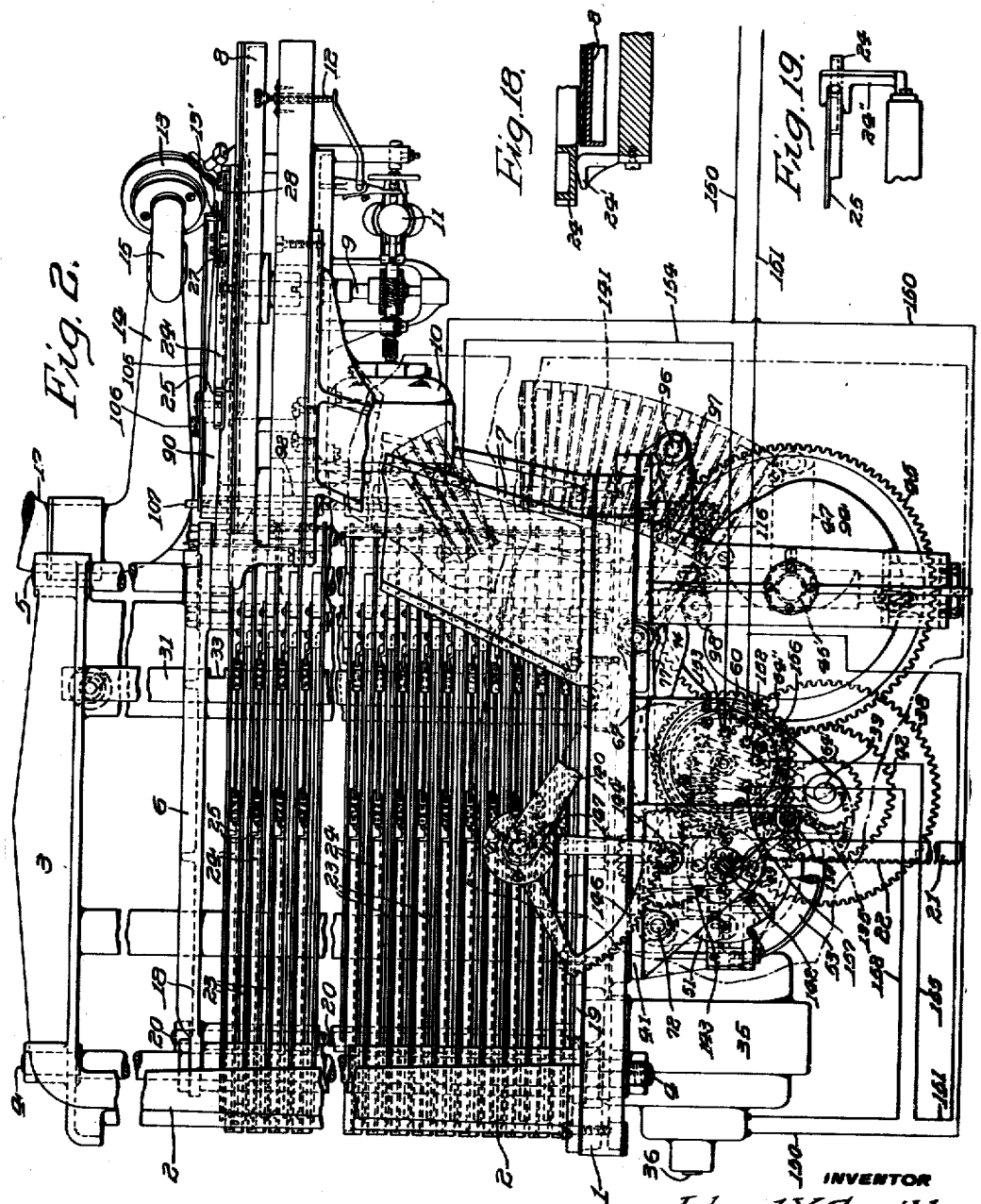

As shown in Figs. 1, 1$^a$, and 1$^b$, each carrier 24 is provided with a notch 29 near the pivotal point of the carrier and this notch is adapted to be engaged by key 30 on the upright oscillating shaft 5 which forms one means for swinging the carriers 24 in the manner above indicated. It is to be understood that any form of mechanism other than this particular means, might be used for oscillating the carrier, but it is evident that the means illustrated, forms a very compact and efficient arrangement for both pivoting and swinging the different carriers. The magazine rack 6 is provided with means for locking in position all of the records, excepting the one being swung on to the playing mechanism to be played and returned to the magazine. A suitable locking structure is illustrated in Figs. 1 and 2 and comprises a notched bar 31 extending throughout the entire height of the record magazine and engaging in the recess 32 on the curved carrier arm 24 locking the same from movement about their pivotal points. A notch 33 in the bar 31 is located at the proper place so as to permit the lug 34 on the carrier 24, formed by the notch 32, to pass by the locking bar 31 when a record is in proper relative position to be swung onto the reproducing apparatus.

The mechanism for oscillating the shaft 5 which, as stated above, forms one suitable means for swinging the record from the rack to the turntable and from the turntable back to the rack, will now be described. Attention is called to Fig. 3 in which this shaft oscillating mechanism is shown, but any particular form of mechanism for accomplishing this result falls within the purview of this invention and the form illustrated is shown merely by way of example without indicating that the particular form illustrated is an essential of the invention. The shaft 5 is oscillated by a motor operated crank mechanism. Suitably secured in convenient position as by being hung from the base plate 1, is an auxiliary electric motor 35 provided with a shaft 36 on which is located a worm 37 adapted to engage a worm gear 38 carried by a shaft 39 which is suitably supported by brackets 40 and 41 extending downwardly from the bed plate 1. The shaft 39 has secured thereto another gear 42 adapted to rotate a crank gear 45 on a shaft 45' which has adjacent the periphery thereof an outwardly extending crank pin 46 to which a crank arm 47 is connected by a universal joint. The crank arm 47 may be connected to the shaft 5 by various constructions and, as shown, is pivoted thereto and forms the means which oscillates the said shaft 5 and the carriers 24. The crank pin 46 may be of any desirable construction, and as shown is in the form of an acorn and co-operates with the cup-shaped end of the crank arm 47 to swing the arm back and forth as the pin 46 makes a complete revolution on the crank gear 45. In order to support the record and carrier during swinging movement, I have provided a supporting and guiding lug 24' shown in Figs. 1 and 18, and this lug, together with the notched guide 24" shown in Figs. 1 and 19 on the other side of the motor board, form means for vertically positioning the carrier 24 relatively to the turntable 8, permitting the record itself to be then supported by the turntable during reproduction.

Figure 3:
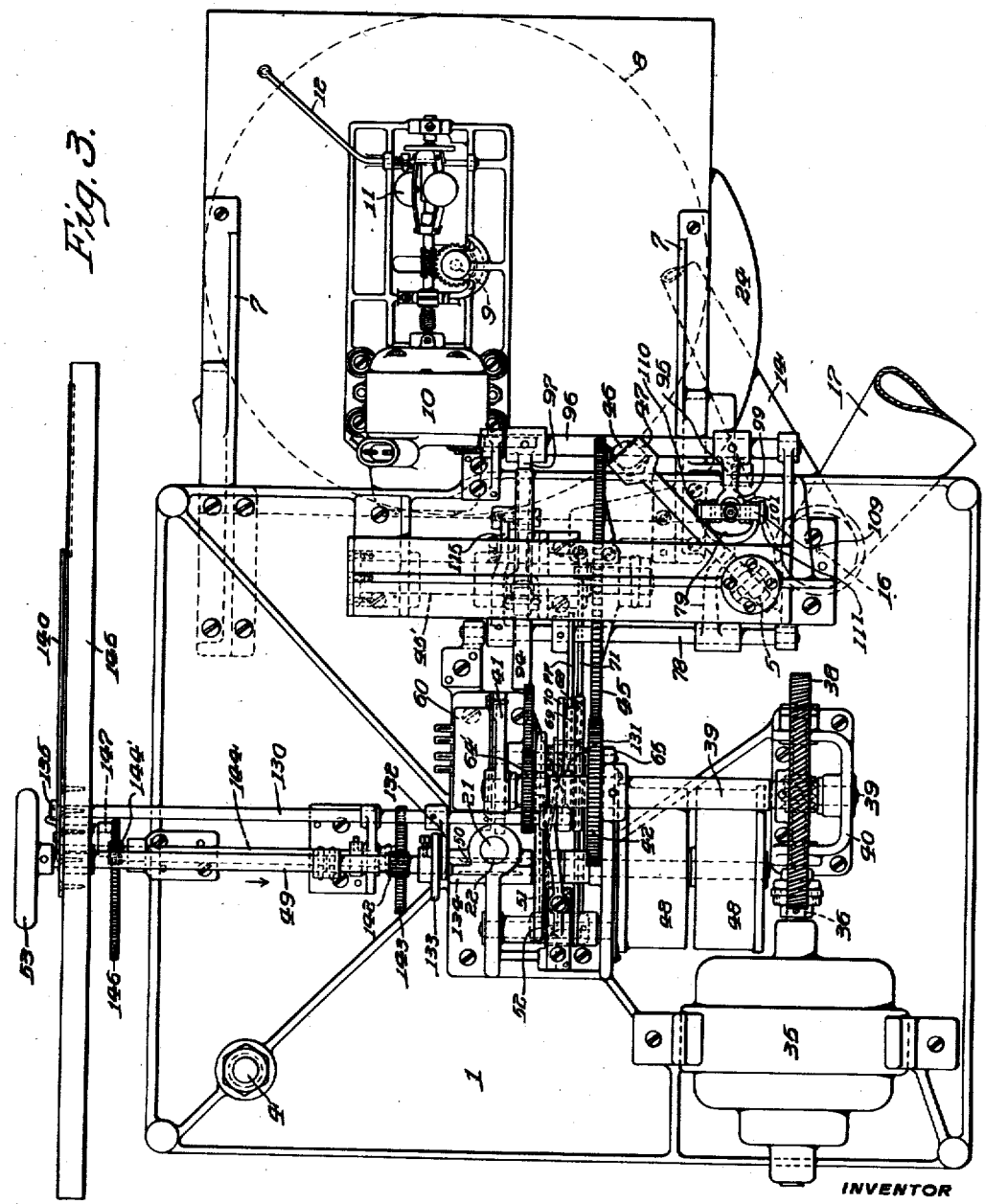

After one record has been played and returned to the rack, the rack is then moved so that a new record will be in position to be swung onto the turntable of the reproducing mechanism. Any form of mechanism for operating the rack might be used and I have shown as a convenient means therefor, the spring motors 48 located on a transverse shaft 49 which has a section provided with gear teeth 50 shown in Figs. 3 and 6 adapted to mesh with the teeth 22 on the magazine elevating shaft or rod 21. The shaft 49 is preferably longitudinally movable for a purpose that will hereinafter appear, and therefore the operative engagement between the spring motors 48 and shaft 49 is preferably by a pin and slot connection 48' shown in Fig. 6, thus permitting the shaft 49 to move endwise of the spring motors without disengaging the connection between the two. It is to be understood that the rod 21 is normally prevented from being elevated by the spring motor 48, excepting at the proper time in the cycle of operations of the entire mechanism, and for this purpose an escapement disk 51 is disengageably secured to the shaft 49 and is normally prevented from rotating by a lug 52 thereon which is engaged by a suitable detent which will be more fully described. The shaft 49 extends exteriorally of the device as shown in Fig. 3 and is provided with a hand wheel 53 which forms means for operating the magazine manually, as for example, when all of the records have been played and it is desired to select a record or to lower the entire magazine so as to bring the record which was first played back to initial position so that the automatic machine may again be operated to play the series of records contained in the magazine. For this purpose the shaft 49 which is arranged to be shifted longitudinally, operates to disengage the shaft from the escapement disk 51 so as to permit of its rotation manually. The connection between the shaft 49 and disk 51 is, therefore, by way of a suitable clutch mechanism. the disk 51 having secured thereto a hub 54 shown in Fig. 6 which is provided with notches 55 adapted to be engaged by transverse pin 56 secured to the shaft 49. The hub 54 abuts against the positioning collar 57 which is provided with an annular recess 58 which receives the pin 56 when the clutch is disengaged and the shaft is moved in the direction of the arrow shown in Fig. 6. It will thus be apparent that the pin 56 is then disengaged from the hub 54 and the shaft 49 is free to be rotated manually by the handle 53.

The operation of the two sets of mechanisms forming the essential parts of the invention, namely, the talking machine or reproducing apparatus proper, and the record supplying and removing mechanism therefor, is automatically controlled in proper sequence to perform the cycle of operations as indicated above. Various forms of controlling mechanisms could be employed which would insure the proper operation of the apparatus and there is illustrated as one convenient means for accomplishing this control of the mechanism, the following arrangement: By reason of the use of the electric motors 10 and 35 (Fig. 3), the operation of the same may be readily controlled by a switch which is automatically controlled by a suitable mechanism which in turn is actuated by the various units of the entire machine to thereby effect the proper control of the entire apparatus. The switch itself is most clearly illustrated in Figs. 8 and 9, although any form of switch might be used. However, I have provided a switch 60 in which a shaft 61 carrying a pair of contacts 62 and 63 is adapted to be rotated by a spring motor 64 secured to the shaft 61. The shaft 61 is supported by any convenient means, as by bracket 65 extending from the base plate 1. A stationary box-like structure 66 incloses the rotating fingers 62 and 63 and is secured against movement in any manner as by being fastened to the plate 67 extending from the base plate 1 of the machine. The cover plate 66 is provided with a plurality of contacts connected to the motors 10 and 35 and to the source of current supply in a manner presently to be described. The movement of the contact fingers 62 and 63 under the action of the spring 64 is normally restrained by an automatically operated controlling mechanism, and numerous devices could be constructed for performing this function. As a convenient means for controlling the switch, there is shown herein a plurality of cams 68, 69 and 70, although a single cam, as hereinbelow pointed out, could readily be used therefor. Each of these cams is controlled by a set of levers whose actuation by other parts of the mechanism in periodic sequence permits the operation of the switch, and hence the operation of the two motors 10 and 35. The cam 68 is provided with a plurality of projections 68$^a$, 68$^b$ adapted to be engaged and controlled by a lever 71 shown in Fig. 4. The lever 71 is adapted to be actuated by the crank gear 45 and is pivoted to a suitable support at 72 and has a bell crank extension 73 connected therewith. As shown in Fig. 4, the bell crank lever 71 extends forwardly and has a slightly curved end 74 adapted to be engaged by a pair of detents or dogs 75 and 76 carried by the crank gear 45 and adapted to be located at different distances from the center of said crank so that one of the dogs will move the lever 74 a greater distance than the other for a reason that will hereinafter appear. The cam 69 is provided with a single projection 69$^a$ which is adapted to be engaged by a lever 77 shown in Figs. 3 and 4 which is secured to a suitable pivot bar or rod 78 and the pivot bar has a rocker arm 79 (see Fig. 3) extending in the direction opposite to that of the lever 77. The arm 79 and lever 77 are adapted to be moved in unison and are so arranged to be actuated by a suitable tripping device controlled by the reproducing mechanism as will hereinafter appear. The third cam 70 is provided with a projection 70$^a$ adapted to be controlled by a third controlling lever 80, (see Fig. 4), which is pivoted at 72 and has a lug 81 thereon which is adapted to be operated by a set of projections 82 located on the escapement disk 51 which con- Patented Oct. 24, 1922.

1,433,103

UNITED STATES PATENT OFFICE.

LLOYD Y. SQUIBB, OF CAMDEN, NEW JERSEY, ASSIGNOR TO VICTOR TALKING MACHINE COMPANY, A CORPORATION OF NEW JERSEY.

AUTOMATIC TALKING MACHINE.

Application filed September 15, 1917. Serial No. 191,535.

*To all whom it may concern:*

Be it known that I, LLOYD Y. SQUIBB, a citizen of the United States, and a resident of the city of Camden, in the county of Camden and State of New Jersey, have invented certain new and useful Improvements in Automatic Talking Machines, of which the following is a specification.

The object of this invention is to provide an automatic talking machine for automatically playing a plurality of records either in series, or selectively which comprises in general a mechanism whereby a sound record is automatically transferred from a suitable holder or magazine containing a plurality of records, to a suitable reproducing machine, automatically played thereon, and then returned to the magazine, the operation being then automatically repeated. Broadly speaking, this invention includes an automatic talking machine having a sound reproducing mechanism on which a record may be operated to reproduce its selection, and an auxiliary mechanism for automatically selecting the record from a magazine and transferring the same to and from the reproducing mechanism, the cycle of operations being automatically performed in timed sequence thus providing a compact and efficient apparatus of the character indicated.

In carrying out this invention, a mechanism has been provided in which the various parts for carrying out one step in the cycle are so inter-related and constructed as to form the actuating means for setting in operation or for actually operating the mechanism for performing the next step in the cycle of operation. In this manner a unitary machine is provided in which only comparatively few elements are necessary in view of the several functions accomplished by each and in which all unnecessary elements are eliminated.

By this invention any number of records of various sizes may be used and the apparatus automatically operates regardless of the length of each record played. One embodiment of my invention includes the use of a suitable motor for operating the mechanism for reproducing the sound and a suitable motor for operating the record shifting mechanism, these motors being so controlled by a unitary controlling mechanism that when the talking machine motor has finished the reproduction of one record the same is stopped and the other motor automatically thrown into operation to return the record to the magazine and after another record is either manually or automatically selected, the auxiliary motor again operates to shift a new record onto the turntable or record support of the reproducing mechanism, and the main motor is then again set in operation.

The operation of the entire mechanism is automatic throughout and the cycle of operations may be summarized as follows:

In normal position all of the records are located within the magazine and the apparatus may be started manually by operation of the main controlling device. A record is first transferred from the magazine to the reproducing machine by the operation of a suitable carrier actuated by the auxiliary motor. As the record is being positioned upon the turntable of the sound reproducing mechanism, the carrier operates to return the reproducer and sound box which has been raised and left above the record at the end of the groove in the same, to the periphery of the turntable or the initial starting position. The sound box is then automatically lowered onto the record and the auxiliary motor thrown out of operation whereupon the main motor simultaneously begins to operate the reproducing mechanism proper and the sound box is propelled over the record in the usual manner or in any desired manner, reproducing the sounds of the particular record being played. As the reproducer reaches the end of the record it engages a suitably arranged actuating mechanism which effects an operation of the motor controlling device to shut off the main motor and again throw into operation the auxiliary motor. This operation raises the sound box off the record and operates the carrier to return the record to its proper position in the magazine. As soon as the record is returned to the magazine, the magazine moving mechanism is automatically thrown into operation so as to bring another record into position to be transferred to the reproducing mechanism. The magazine moving mechanism after moving the magazine a predetermined distance, operates to again throw into operation the auxiliary motor which transfers a new record onto the turntable of the sound reproducing mechanism. The sound box or reproducer has been lowered to an intermediate position so that as the carrier moves outward it engages the sound box and returns it to proper starting position. This completes one cycle of operation and the apparatus then automatically operates to repeat the same as long as desired. It will thus be seen that in this mechanism each step in the cycle of operation is so arranged that the one is thrown into action by the preceding step and in this manner a very efficient and compact mechanism is produced.

It is evident that many forms of mechanism may be provided for carrying out the objects of this invention, and I have shown one means for accomplishing each of the steps forming a part of my invention. The mechanism shown for carrying out each operation, however, is merely shown for the purposes of illustration and the particular form of mechanism is not particularly essential since the means for operating each step in the proper sequence above indicated is subordinate to the general organization and construction whereby an automatic talking machine of the character indicated is produced which efficiently operates in the performance of the functions required by reason of the inter-relation and coaction of the various mechanisms, thereby accomplishing the objects intended.

In the drawings forming a part of this specification, Figure 1 is a plan view; Figs. 1ª and 1ᵇ show details of the mechanism of Fig. 1; Fig. 2 is a side elevation; Fig. 3 is a bottom plan view; and Fig. 4 is an elevation, partly in section, of certain parts of the operating mechanism. Fig. 4ª is a detail of a part of the mechanism shown in Fig. 4. Fig. 5 is a sectional view of the sound box elevating mechanism; Fig. 6 is a bottom plan view partly in section of the operating mechanism; Fig. 7 is an elevational view, partly in section, of the magazine elevating mechanism; Fig. 8 is a sectional view of the controlling switch and its actuating mechanism: Fig. 9 is a section on the line 9—9 of Fig. 8; Figs. 10, 11, 12 and 13 are diagrammatic views of the motor controlling switch and the actuating cams therefor, while Figs. 14, 15 and 16, are diagrammatic views illustrating the manner in which the sound box is raised and lowered from and to engagement with the sound record. Figs. 17, 18, 19, 20 and 21 are detail views of parts of the mechanism.

A suitable frame work is provided for supporting the entire mechanism of both the record magazine and the sound reproducing mechanism. Any form of support, it will be readily understood, could be used and I have shown a convenient arrangement in which the base plate 1 is adapted to support the record magazine and for that purpose is provided with a series of upright members 2 having an overhanging cross frame 3 preferably cast integral with the uprights and shown in Figs. 1 and 2. Extending between the base 1 and cross frame 3 is a plurality of guide rods 4 and 5, adapted to form the means for guiding the movement of the record magazine 6. As indicated in Fig. 2, the base plate 1 is also provided with a plurality of side brackets 7 which form a convenient means at the side of the magazine for supporting the sound reproducer or playing mechanism adjacent the record magazine and in close proximity thereto.

Any form of sound reproducing apparatus may be used in this invention and the form illustrated, which will now be described, is of the disc type in which a turntable 8 is rotated by a vertical spindle 9 which in turn is actuated by a motor 10 which in the present case is shown as an electric motor. A suitable governor, 11, and speed controlling mechanism 12, may be used so as to insure a proper speed of rotation of a record placed on the turntable. A sound box 13, of any desired type, may be used to reproduce the selection on the records and in the present form, the connection to the tone arm 14 is by a gooseneck connection, 15. The tone arm 14, may be suitably pivoted at 16, and at the same time connected with any form of amplifier 17, it being evident that all of these parts are illustrated in the drawing merely as a convenient arrangement for use in connection with the present invention.

The record magazine or holding rack will now be described and it is evident that various kinds of racks or magazines may be constructed for carrying out this part of this invention without departing from the spirit and scope of the same. In the form illustrated herewith, an upper and lower cross frame 18 and 19 are connected by suitable uprights 20, the lower frame 19 forming a bearing or support to which the magazine elevating and lowering rod 21 may be secured. This rod extends down below the main frame 1 as shown in Fig. 2 and is provided with a rack 22 and thus forms one means for elevating or lowering the magazine 6. Suitably spaced along the upright 20 and rods 4 and 5 of the record magazine are a plurality of transverse plates 23 which form separate compartments, each adapted to receive and support a record carrier and any desired record which may be placed therein and which it is desired to have automatically played.

Various forms of record carriers might be used to cooperate with the mechanism for swinging a record back and forth between the magazine and the reproducing mechanism, and in the present invention there is provided an individual carrier for each record, each carrier being provided with adtrols the operation of the magazine elevating mechanism. The cams 68, 69 and 70 for controlling the switch 60 and the operating levers therefor, as described, are controlled in periodic sequence by the operation of the mechanism in a manner which will more fully appear in describing hereinafter the complete operation of the machine. It is, of course, to be understood, that a single cam of proper width or form, could readily be used in place of the several cams 68, 69 and 70, it being merely necessary to properly arrange the various lugs 68ª, 68ᵇ, 69ª, and 70ª thereon so as to properly cooperate with their controlling levers.

In order to automatically maintain the switch operating motor 64 energized as the same is de-energized by operating mechanism 60, I have provided a connection between the same and the auxiliary motor 35 for rewinding the spring 64 as the same is unwound. For this purpose, the motor 35 is connected by a train of gears to the spring barrel 64, the gear ratios being such that the spring motor 64 is wound up in two half revolutions, namely, during the two operations of the auxiliary motor 35 in a complete cycle of operation of the entire mechanism, whereas, the spring motor 64 unwinds in four quarter turns under the controlling action of the cams and the controlling levers just described. For this connection, a gear 64' is located on the shaft 39, which is rotated by the worm gear and worm connections to the motor 35 and the gear 64' is adapted to engage a gear 64" and which is directly connected to the spring motor barrel 64, thus connecting the motor 35 and spring motor 64.

The mechanism for raising and lowering the sound box from the record, after the same has been played, in order to permit a new record to be placed on the turntable of the reproducing mechanism, will now be described.

It is evident that the sound box elevating mechanism could be constructed in various ways and also could be controlled in its operation from various operating parts of the machine as a whole. As a convenient and efficient construction for performing this function, I have provided an overhanging arm 90 extending over the record support 8, operating to support the sound box 13 as shown in Figs. 1 and 2, the particular connection between the arm and sound box being by way of a pin 13' suitably secured to a sound box and resting in a slot 91 on the arm 90, suitably curved as shown in Fig. 1 to permit the relative movement of the sound box and arm 90 in the operation of the machine. The arm 90 is secured to a vertical hollow shaft 92 which extends through a suitable bearing 93 in the base plate 1 as shown in Fig. 4 and is provided with means to engage a suitable cam 94 secured to the shaft 45' and movable in unison with the crank gear 45 previously described. This cam 94 is adapted to control the position of the upright shaft 92 and sound box carrying arm 90 so as to properly position the sound box during the different periods in the operation of the machine. For this purpose a convenient form of connection between the upright shaft 92 and cam 94 is by lever 95, rock shaft 96 and the cam engaging lever 97 provided with an engaging roller 98, these parts being rigidly connected excepting that the lever 95 is connected to the lower end of the upright 92 by a link connection shown in Figs. 3, 4 and 5. For this purpose, the arm 95 is provided with a forked end 99, each end being connected by links 100 and 101 to a collar 102 secured in position at the lower end of the shaft 92, as best shown in Fig. 5. The sound box elevating mechanism thus described also forms a convenient means for carrying a tripping mechanism adapted to control one of the levers, namely, lever 77, of the switch mechanism 60, when the sound box has been propelled over the record and finished playing the selection contained therein. The mechanism which I have utilized for accomplishing this, comprises a pivoted latching member 105 which is located on the sound box carrying arm 90. A spring 106 constantly urges the pivoted latch 105 against an upright rod 107, located within the hollow shaft 92. Rod 107 is provided with a notch 108 with which the pivoted lever 105 is adapted to latch. The rod 107 extends downwardly through the shaft 92 and is connected to the controlling lever 77 in a manner illustrated in Figs. 3, 4 and 5. A cross head 109 is secured to the rod 107 and provided with upwardly extending links 110 and 111 adapted to be pivoted to the forked ends of the lever 79 which is connected in the manner above described and is shown in Fig. 3, so as to control the lever 77. A coiled spring 112, is located around the rod 107 and between the cross head 109 and lower end of the hollow shaft 92 adapted to facilitate the operation of the releasing mechanism as will hereinafter appear. The pivot 78 for the levers 79 and 77 is also provided with an arm 115 shown in Fig. 4 located adjacent the sound box elevating and controlling cam 94 with which the arm 115 engages at times and is provided with a roller 116 for this purpose. In this manner it will be seen that the cam 94 forms means for controlling at times both the hollow shaft 92 and the inner rod 107.

The mechanism which is provided for controlling the magazine elevating mechanism will now be described. Since the spring motor 48 normally tends to operate the shaft 49, it is evident that some means for controlling this operation both as to its timed relation to the other parts of the mechanism and as to the extent of its movement, is necessary. As a convenient structure for accomplishing this, there is provided a mechanism for controlling the escapement disk 51 which governs the action of the magazine operating mechanism. As shown in Fig. 6, the lugs 52 on the disk 51 abut against a suitable movable stop bar 120 whose movement into and out of engagement with the lugs 52 may be readily controlled by the switch cam controlling lever 71 above described. One form of mechanism for this purpose comprises the stop bar 120 which is mounted to slide in a block or track 123. A pin 121 is secured thereto and passes through a suitable opening in the block 123, into a slot 122 in the bell crank lever 73 so that a movement of the lever will move the pin 121 and bar 120. The member 123 is provided with a groove 125, as shown in Fig. 7, in which the bar 120 is adapted to slide. Suitable retaining members 126, located on each side of the member 123, extend over the groove 125, and retain the bar in sliding position. The bar 120, is provided with a notch 127 which permits the lugs 52 on the magazine elevating escapement disk 51 to pass therethrough when the bar 120 has been moved by the lever 71, into proper position. The other set of lugs 82 on disk 51, being a greater distance from the center of disk 51 than the lugs 52, pass unhindered through the notch 127 into the bar 120 as the disk revolves, this action being shown in Fig. 17, and the bar 120 has no retaining action whatever on lugs 82. As shown in Fig. 6, one lug 52 is being normally retained by the bar 120, against movement. Upon the proper operation of the lever 71 by the dog on the crank gear 45, the bar 120 moves in the direction of the arrow in Fig. 6 to release the lug 52, as will hereinafter more fully appear.

In order to insure the proper positioning of each of the separate mechanisms before the machine can be started and also to insure the stopping of the machine at a proper point in the operation of the mechanism, I have provided a safety controlling mechanism which insures the proper elevated position of the record magazine so that the oscillating shaft 5 may properly swing a record onto the rotating record support. As one means for accomplishing this result, I provide a safety latch for preventing the operation of the switch 60 when the magazine elevating mechanism is being shifted manually and means for preventing the manual operation of the magazine when the machine is being automatically operated. A shaft 130, is located adjacent the magazine elevating shaft 49 and has secured thereto a stop finger 131 shown in Figs. 3, 4 and 4ª and adapted to engage, when in safety position, with the lug 69ª on one of the switch controlling cams 69, (Fig. 4ª). The shaft 130 also has secured thereto a safety lug 132 adapted to be positioned between a flanged collar 133 on the shaft 49 and any stationary part of the machine as the edge of the bearing 134 for the magazine elevating gear 50. An operating hand button 135 is secured to the shaft 130 adjacent the operating handle 53 on the shaft 49. It will be noted that before the shaft 49 can be shifted in the direction of the arrow, shown in Figs. 3 or 6, to operate the magazine by hand, it is necessary that the shaft 130 be first rotated to remove the lug 132 from the path of movement of the flanged collar 133 and that this movement throws the stop finger 131 into locking engagement with the lug on the switch controlling cam 69. After shifting the shaft 49 the machine cannot now be thrown automatically into operation because the flange 133 interferes with the movement of the lug 132 and prevents rotation of the shaft 130 to release the finger 131. To start the machine, the shaft 49 and hence collar 133 must be moved to the right as shown in Fig. 7, in order to reengage the clutch 55 whereby the flange 133 is removed from the path of movement of the lug 132, then the shaft 130 may be rotated to release the finger 131, permitting the starting of the machine and at the same time moving the lug 132 back into locking position with the collar 133.

In order to indicate the particular record being played and to facilitate the selection of any desired record, a pointer 140 is so arranged as to be controlled by the positioning of the magazine rack and is suitably located at the exterior of the machine to cooperate with a series of legends 141 containing the means for identifying the various records in the magazine. Any suitable means for moving the pointer 140 in conjunction with the position of the magazine rack 6 could be employed, and as shown in Figs. 2 and 3, the magazine elevating shaft 49 is provided with a gear 142 adapted to mesh with a gear 143 on an auxiliary shaft 144. The shaft 144 extends to the outside casing or wall 145 of the machine and has a gear 144' which meshes with a segmental gear 146 which is coupled to the pointer 140 by a shaft 147, (see Fig. 2).

A source of electrical current is supplied through the switch mechanism to the motors 10 and 35, and one form of wiring for the mechanism is shown in Fig. 2 and in the diagrammatic Figures 10 to 13. As shown herein, lead 150 extends from a source of supply to one terminal of each of the motors 10 and 35, while another lead 151 extends from one terminal 152 of the switch mechanism to the outside return line. The other cooperating terminal 153 is connected by a lead 154 to the other terminal of the motor 10. The return line for the current through the lead 151 is also connected by a lead 155 to a terminal 156 of the switch mechanism and a cooperating terminal 157 is connected by a lead 158 to the other terminal of the auxiliary motor 35. A third set of terminals 159 and 160 on the switch cover 63 are each connected with the terminals 157 and 156 by bars 161 and 162. The manner in which the circuits are made and broken will appear from the description of the entire operation of the automatic machine.

Figure 10:
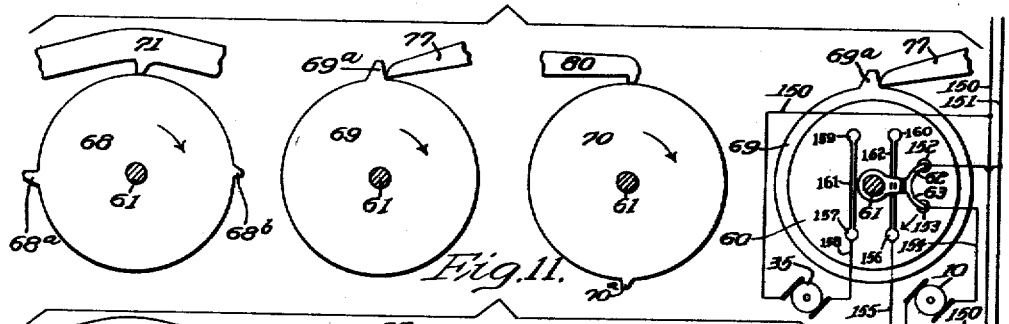
Figure 13:
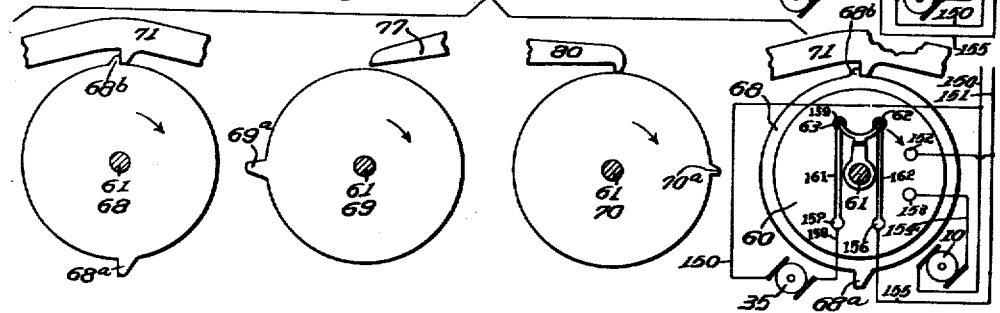

The cycle of operations performed by the mechanism described in the foregoing specification, occurs as follows: The records are placed in the individual carrier 24 by being positioned underneath the bridge 25 and are held therein by the spring slip 26 and a projection entering the usual central opening in a record, being also partially supported in the magazine rack by the shelves 23. When the magazine has been adjusted manually to its lowermost position and the safety latching mechanism 130 above described has been rotated to remove the finger 131 from the path of the switch controlling cam 69, the power is turned on. An individual record carrier and record is then shifted from the magazine to the turntable support by the record supplying and removing mechanism. This is accomplished by reason of the fact that the spring motor 64 of the switch mechanism is permitted to operate to throw the auxiliary motor 35 into operation. Through the chain of gears 37, 38 and 42, the crank gear 45 is rotated to oscillate the shaft 5 which, by reason of the pin, 30, (Figs. 1$^a$ and 1$^b$) thereon, engaging the notch 29 in the carrier 24, swings the same outward through an arc of about 90 degrees. The sound box 13 was elevated and held in its highest position by the arm 90 when the last record was removed from the turntable, but when the cam 94 which rotates with the crank gear 45, has been moved thereby, it operates to lower the arm 90 to intermediate position as shown diagrammatically in Fig. 16. In this position the outer dog 28 which is properly adjusted on the carrier bridge 25 engages the sound box carrying arm 90 and thus swings the tone arm and sound box outwardly to initial or starting position, the parts slowing down gradually to stopping position by reason of construction of the crank gear 45, which eliminates the necessity for a separate position stop for the tone arm and sound box. This gear 45 oscillates arm 47 and shaft 5 slowly at first, rapidly increasing its speed, and then gradually slowing down to stopping position which so reduces the momentum of the parts as to bring the carrier, and sound box to proper stopping position just indicated. When the record carrier reaches its proper operative position on the turntable 8, the record rests thereon and is adapted to be rotated by the frictional engagement between the record and support as the turntable is being revolved. The position of the switch controlling cams 68, 69 and 70 and the motor connections at the period just preceding this point are illustrated in Fig. 13, and it will be seen that the motor 35 is supplied with current and the position of the switch is being controlled by the cam 68 and lever 71. The circuit for supplying current to the motor 35 as shown in Fig. 13, is from the lead 150 to one terminal of the motor 35 and from the other terminal through the lead 158, contact point 157, bar 161, contact 159, switch arms 62 and 63, contact point 160, bar 162, contact point 156, lead line 155 to the return line 151. In order to release the motor 35 and throw into operation the turntable motor 10 at this point, it will be noted that, as the crank gear 45 reaches the position shown in Fig. 4, the dog 75 thereon, raises the lever 71 through a short distance, releasing the holding lug 68$^b$ shown in Fig. 13. This permits the spring motor 64 to rotate the switch and move the parts from the position shown in Fig. 13 to that shown in Fig. 10, shutting off the supply of current to the motor 35 and operating the turntable motor 10. At the same time the sound box carrying arm 90 is lowered to its lowermost position so that arm 90 is beneath and out of the path of dog 28. This action occurs by reason of the engagement of the roller 98 in the lowermost portion of the cam 94 as shown in Fig. 14. The circuit for supplying current to the motor 10, as shown in Fig. 10, is from the lead 150 to one terminal of the motor 10, hence from the other terminal by the lead 154 to the contact point 153, switch arms 63 and 62, contact point 152 and return lead 151.

Figure 11:
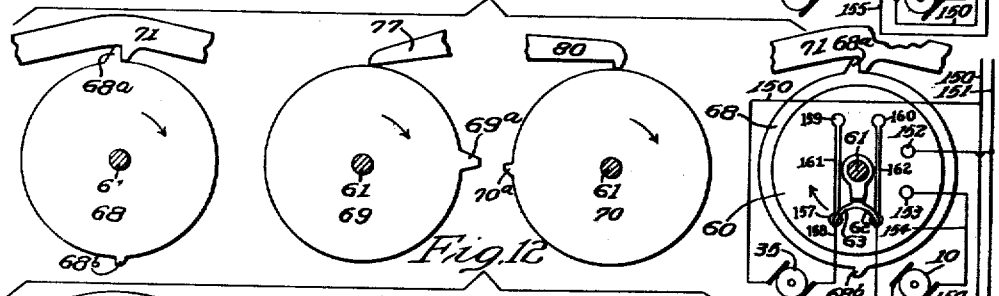

The record is now playing and the sound box is propelled across the same by reason of the engagement of the stylus with the record groove. It will be noted that, during reproduction, the guide 24' and slotted guide 24'' form means for leveling and holding in proper vertical position the carriers 24, permitting the record to rest flat upon the turntable 8. At this time the lever 77, as shown in Fig. 10, is engaging the lug 69$^a$ of the cam 69 to hold the switch mechanism in this position and supply the current to the turntable motor 10. As the sound box approaches the center of the disc, it engages the lug 27 located on the bridge 25, and causes the tripping of the lever 77 to permit the spring actuated switch to throw off the power to the turntable motor 10 and to again throw into operation the auxiliary motor 35. This is accomplished by reason of the fact that, as the tripping lever 105 carried by the sound box supporting arm 90, engages the dog 27, it is swung about its pivot and released from the notch 108 in the rod 107. The weight of the rod, together with force of the spring 112, act to force down the cross head 109, shown in Fig. 5 and the links 110 which are connected to the forked end of the lever 79. As shown in Fig. 3, this movement of the lever 79 downward, moves the cam controlling lever 77 upward and releases the same from the lug 69ª as shown in Fig. 10, permitting the spring operated switch to move to the position shown in Fig. 11. This immediately throws the turntable motor 10 out of operation and throws into operation the record shifting motor 35, the parts being held in this position by the lever 71 engaging the lug 68ᵇ of the controlling cam 68. As indicated in Fig. 11, the circuit supplying current to motor 35 when the switch is in this position, is by way of the lead 150 to one terminal of the motor 35, hence by the other terminal through the lead 158 to the contact point 157, through the switch arms 62 and 63, contact point 156, lead 155 to the return lead 151. The operation of the motor 35 rotating the crank gear 45 now swings the record carrier 24 back into the magazine. At the same time the cam 94 operates to elevate and hold in elevated position the sound box through the lever 98 and shaft 92 as above described. The position of the cam 94 in this position, is shown in Fig. 15 and the sound box carrying arm 90 is seen as being held in its highest position.

Figure 12:
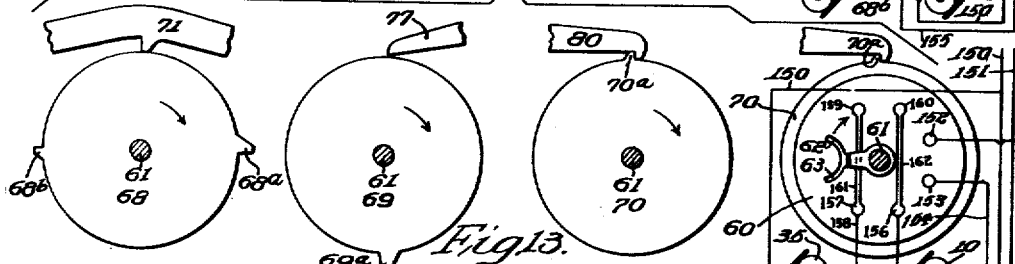

When the record has been returned to its proper position in the magazine, the mechanism automatically operates to throw out of operation motor 35, and, both of the motors 35 and 10 now being inoperative, the mechanism then sets into operation the magazine elevating means. This is accomplished by reason of the engagement of the dog 76 on the crank gear 45 with the lever 71 when the gear 45 reaches the position in which the carrier 24 has been returned into the record supplying or removing mechanism. In this case the dog 76 moves the arm 71 through a greater distance than the other dog 75 moved the same, resulting in a release of the switch cam 68 as before, and also effecting an operation of the retaining bar 120 which controls the magazine elevating mechanism through escapement disk 51. The position of the switch in this period is shown in Fig. 12 where it will be seen that the current is cut off from both the motors and the cam 70 controlling the position of the switch by reason of the controlling lever 80. By reason of the extended movement of the arm 71 by the dog on the crank gear 45, the bell crank arm 73 through the pin 121 has shifted the controlling bar 120 in the direction of the arrow shown in Fig. 6 a sufficient distance so that the lug 52 on the escapement disk 51 is free to pass through the notch 127 in the bar. This permits the spring motors 48 to rotate the shaft 49, gear 50, elevating rod 21 and magazine 6. The extent of movement of the magazine elevating mechanism is controlled by the position of the second lug 52 on the disk 51 which, when the disk makes a half revolution, engages the bar 120, the bar 120 having been returned in the meantime to its normal position shown in Fig. 6 by reason of the drop of the lever 71 again to normal position as soon as the dog 76 moves past the lever end 74.

By this operation a new record has been brought into proper position to be engaged by the oscillating shaft 5 and is ready to be swung from the record supplying and removing mechanism to the talking machine turntable 8 or reproducing mechanism. In order to again throw into operation the auxiliary motor 35, which is the actuating means for the shaft 5 through the connection previously described, some means must be provided for throwing the switch 60 from the position shown in Fig. 12, in which both of the motors are thrown out of operation, to the position shown in Fig. 13 in which current is supplied to the auxiliary motor 35. To accomplish this, the lever 80, which holds the switch 60 in the position shown in Fig. 12, is released and a convenient means for moving lever 80 is by the lugs 82 located on the escapment disk 51. These lugs have a beveled face as shown in Fig. 4 and just before the elevating mechanism is arrested by one of the lugs 52, one of the other sets of lugs 82, engages the projection 81 on the lever 80, thus releasing the cam 70, permitting the spring motor 64 to rotate the switch from the inactive position of Fig. 12 to the position shown in Fig. 13. The motor 35 is now thrown into operation and the mechanism operates in the manner described as the first operation in the complete cycle, swinging a new record over onto the talking machine turntable 8. The cycle of operations is then thereupon automatically repeated as long as desired until the entire supply of records is exhausted and the mechanism is then shut off, either manually, by turning off the outside supply of current, or automatically, by the engagement of the top of the magazine 6 with the overhanging frame, which, through the connected mechanism prevents the escapement disk 51 from turning when released, thus stopping the operations of the entire machine.

As a part of the automatic action of the machine, it will be noted that the tripping lever or rod 107 is automatically reset as the tone arm and sound box are being swung outward to initial starting position by the tone arm carrier arm 90. This result is accomplished by the action of the cam 94 on the controlling levers 97 and 115. As best illustrated in Figs. 15 and 16, it will be noted that when the sound box has finished a record, the lever 97 has elevated the shaft 92 and arm 90 to its highest position and the tripping rod 107 is also retained in its high position by the engagement of the lever 115 with the cam 94 as shown in Fig. 15. These parts retain this position during a greater part of the movement of the cam 94 as will be indicated by the relatively large length of the high portion of the cam. During this period, the mechanism is operating to return the record which has been played to the magazine and the magazine elevating mechanism brings a new record into proper elevation. The cam 94 when it has reached the position shown in Fig. 16, permits the lever 97 to fall to intermediate position, but retains the lever 115 in high position. This lowers the hollow shaft 92 relatively to the inner rod 107 and thus permits the latch 105 by reason of the spring 106 to engage in the notch 108 of the rod 107 latching the same in set position. When the cam 94 then moves to the position shown in Fig. 14, the lever 97 falls to the lowest position, but the lever 115 is retained in the position indicated by reason of its being latched in the manner just indicated. This is the position which the cam 94 and its operative parts retain while the record is being played and it will be evident that, as above indicated, when the sound box carrying arm reaches the end of the record, its engagement with the inner dog 27 on the carrier bridge, trips the latch 105 in the manner previously described to release the same and permit the actuation of the controlling switch 60 to shut off the turntable motor 10 and throw into operation the auxiliary motor 35, as has been described.

Attention is called to the fact that any desired record may be selected manually by the proper operation of the safety control lever 130 and the manual operation of the shaft 49 by the hand wheel 30 which is pushed inwardly to release the pin 56 from the escapement clutch 54, thus permitting the shaft to be rotated to any desired extent and in either direction so that any record may be selected, the pointer 140 indicating the record selected. When the last record has been played, the mechanism is stopped and the entire magazine 6 lowered to its lowest position manually. It will be noted that as the magazine is lowered, the spring motors 48 are automatically rewound, the connection between the shaft 49 and the spring motor 48 being by way of the slot and pin arrangement above set forth and shown in Fig. 6, thus permitting the relative longitudinal movement between the shaft 49 and the spring motors 48 permitting the shaft to assume its two operating positions without disengaging the shaft and the spring motors.

As a further safety arrangement in the mechanism tending to insure against possible injury to the parts, the lugs 82 abut against the stop 81 on lever 80 and thus prevent reverse rotation of the escapement disk 51 and hence lowering of the magazine beyond a certain distance, which might occur if the motors 48, for example, should for any cause fail to raise the magazine the complete distance required during one operation of the motors 48. If this arrangement were not present, the magazine might fall down to the bottom of the supporting frame or base plate 1. When the magazine is being operated manually, the clutch 55 and 57 is disengaged and hence the operation of the magazine is then independent of the disk 51 and may be manually operated to lower the magazine as desired. When the clutch 55 and 57 is disengaged, the disk 51 is free from the rest of the mechanism and I have provided means to hold it in fixed position so that when the clutch is reengaged all the parts of the mechanism will be in position to insure the proper timing of the various elements. Thus the disk 51 is held from rotation in one direction when in this free condition by reason of the engagement of a lug 82 with the stop 81 and in the opposite direction by the engagement of one of the other sets of lugs 52 with the stop bar 120.

In Figs. 20 and 21 is shown a modification of the means for detachably securing the record to the carrier in which a stud 163, provided with a thin head 164, is adapted to be slipped through the opening in the record to support the same. The stud 163 is notched at 166 as shown, to slide into the edges of a cutaway portion 168 of carrier bridge 25 as shown in Fig. 21. A spring finger 26' is secured to the carrier bridge 25 and has an opening 170 therein adapted to slide over the projecting end of the stud 163. This finger 26' may be raised and the stud 163 slid laterally relatively to the slot 168 of the carrier to insert or remove a record onto or from the carrier 24 in a manner which will be readily understood.

From the mechanism thus described, it will be seen that by this invention an entirely automatic multiple record playing talking machine is produced which may also be operated so that any desired record may be selected by the operator if desired. Furthermore, an efficiently operating apparatus is provided wherein a sound reproducing mechanism is supplied with playing records and the same are automatically removed therefrom by a suitable record supplying and removing mechanism in which a plurality of record carriers transfer the records to and from the reproducing mechanism, and the several operating units are so arranged as to facilitate or cause the operations of the others and in this manner a compact and positively operating mechanism of the character described is thus obtained. The mechanism for producing these results, which I have illustrated and described, forms one efficient means for carrying out the cycle of operations, but the particular form of construction for performing the various steps is not particularly essential and may be varied within a wide range and still fall within the broad scope of this invention. The detailed mechanism is merely shown as one method of carrying out the invention and it is evident that the details of the form and arrangement of the parts shown herein may be changed by the substitution of other equivalent elements; by modifying or changing the construction; by omitting or adding parts; or by making various other rearrangements without departing from the spirit of this invention as defined in the appended claims.

Having thus described my invention, what I claim and desire to protect by Letters Patent of the United States is:

1. In a sound reproducing mechanism, the combination with a rotatable record support, and a reproducing mechanism of a magazine adapted to form a support for a series of record carriers and records, said series of individual carriers being adapted to hold said records, oscillatory means adapted to be automatically operated to periodically swing a carrier and its record from the magazine to the rotatable record support and return the same to the magazine and means on said reproducing mechanism and on said carrier whereby the oscillatory means operates to return the record to the magazine when the reproducing mechanism arrives adjacent the center of the record and said carrier operates to return said reproducing mechanism to adjacent the periphery of the record as said carrier swings a record to said rotatable record support.

2. In a sound reproducing mechanism, the combination of a rotatable record support, a magazine, a plurality of individual record carriers therein, and means for automatically shifting the carrier horizontally from the magazine to the rotatable record support, said means being also automatically operated to return the carrier to the magazine.

3. In a sound reproducing mechanism, the combination of a rotary record support, a magazine and a plurality of individual record carriers, horizontally movable means engageable with a record carrier and automatically operated to swing said carrier first in an increasing rate of speed and then in a decreasing rate of speed from the magazine to the support and return the same at similar rates of speed to the magazine, and means for automatically moving the magazine to disengage said carrier from the swinging means and to position an adjacent carrier in engaging location therewith.

4. In a talking machine the combination of a sound reproducing mechanism, a driving mechanism therefor, a plurality of individual record carriers adjacent thereto, means to swing said carriers horizontally to and away from operative position on said sound reproducing mechanism, operating means therefor, means controlled by the sound reproducing mechanism for throwing out of operation the driving mechanism for the reproducing mechanism and actuating said carrier operating means, and means actuated by the carrier for automatically bringing the reproducer of the sound reproducing mechanism to proper position in alinement with the periphery of the record on the reproducing mechanism.

5. In a talking machine, the combination of a sound reproducing mechanism provided with a record support, an actuating motor therefor, a series of record carriers, means for transferring the records between the record support and the series of record carriers a motor for actuating said means, means for moving the series of carriers, including an actuating motor therefor, means whereby the operation of said first mentioned motor will operate to start the carrier transferring motor and stop the sound reproducing motor, means to automatically stop said carrier transferring motor and start said series moving motor, and means whereby said series moving motor will be automatically stopped and said transferring motor started.

6. In a talking machine, the combination of a sound reproducing mechanism, a motor therefor, a plurality of record carriers, a magazine for supporting said carriers, means comprising a motor for moving said magazine, means for transfrering a record carrier and record between said magazine and sound reproducing mechanism, a motor for operating said transferring means and a controlling mechanism for each of said motors, automatically operated to start and stop each of said motors in periodic sequence.

7. In an automatic talking machine, the combination of a sound reproducing mechanism including a turntable and an electric motor for operating the same, a record changing mechanism including a record carrier and an electric motor for swinging said record carrier to and from the turntable, and an electric switch in the circuit of said motors and alternately operated by each of said mechanisms, each mechanism being operative to effect the operation of said switch to break the circuit to its motor and to simultaneously close the circuit to the motor of the other mechanism.

8. In a talking machine, the combination of an electrically operated sound reproducing mechanism, an electrically operated record supplying and removing mechanism, a magazine for carrying a plurality of record carriers, an actuating motor therefor, and means whereby said reproducing mechanism, record supplying mechanism and magazine moving mechanism operate in cycle and mutually serve at the close of their respective movements to supply energy to said electrically operated mechanisms and permit the magazine actuating motor to move the magazine.

9. In a sound reproducing machine, a rotatable record support, rotating means therefor, a sound reproducer, a magazine for supporting a plurality of individual record carriers, means for automatically moving a carrier to and fro between the magazine and rotary record support, means for automatically moving the stylus and sound box of the sound reproducer into and out of operative engagement with the record on said rotary record support, and means on said carrier operative to initiate the movement of said stylus and sound box out of operative engagement with the record on said rotary record support.

10. In a sound reproducing machine, a rotary record support, a sound reproducer, a magazine containing a plurality of individual record carriers, means to selectively transfer a record carrier between the magazine and support, means independent of said transferring means for moving the sound reproducer into and out of operative engagement with a record on the support, and means carried by the record carrier for moving the sound reproducer when out of engagement with the record into alinement with the initial playing position of the reproducer.

11. In a sound reproducing machine, a rotary record support, a sound reproducer adapted to cooperate with a record on said rotary record support, a magazine, a plurality of record carriers located therein, means to transfer a record carrier to and fro between the magazine and the rotary record support, and means operated through said carrier and carrier transferring means to move the sound reproducer into initial playing position in the record groove of a record located on said rotary record support.

12. In a multiple record talking machine, the combination of a magazine for supporting a plurality of record carriers, means for swinging a carrier from and back to said magazine, means for automatically moving the magazine to bring a selected carrier into engagement with said carrier-swinging means, and means engageable with said carriers when they are within said magazine to lock the unselected carriers in said magazine to prevent all of said carriers except the selected one from moving transversely with respect to said magazine.

13. In a multiple record talking machine, the combination of a magazine for supporting a plurality of record carriers, means for swinging a carrier from and to said magazine, automatic means for moving the magazine to bring another record carrier into operative position with respect to said swinging means, and manual means for moving the magazine to bring any selected record carrier into engaging position with said swinging means.

14. In a multiple record talking machine, the combination of a magazine for supporting a plurality of records, means for selectively swinging a record out of and into said magazine, automatic means for moving said magazine a predetermined distance including a motor for actuating the same, means for disengaging said automatic means and manually operating said magazine, said manually operated means operating to energize the motor for operating said automatic magazine moving means.

15. In a multiple record talking machine, the combination of a reproducing mechanism, of a plurality of record carriers, one for each record, means located on each carrier adjacent the periphery of the record carried thereby to engage the sound box of the reproducing mechanism, and means on said carrier adjacent the center of said carrier adapted to be engaged by the sound box of the reproducing mechanism, said last mentioned means adapted to effect an actuation of the mechanism for automatically transferring a record carrier out of operative engagement with said reproducing mechanism.

16. In a multiple record talking machine, the combination of a reproducing mechanism, of a plurality of record carriers, means to swing a carrier to and from the reproducing mechanism, means located on the carrier of the carrier swinging mechanism to engage the reproducer and return the same to the periphery of the turntable of the reproducing mechanism, and means on the carrier adapted to be engaged by the reproducer to effect an actuation of the mechanism for swinging a carrier and record carried thereby out of operative engagement with said reproducing mechanism.

17. In a multiple record talking machine, the combination of a reproducing mechanism, a plurality of record carriers, means for automatically shifting a record carrier onto and away from operative position in said reproducing mechanism, means located adjacent the periphery of each record on the record carrier to engage the reproducer of the reproducing mechanism to return the reproducer to a position adjacent the periphery of the turntable of the reproducing mechanism when said carrier is shifted into engagement with the reproducing mechanism and means adjacent the end of the record groove on the record carrier adapted to be engaged by the reproducer to effect the operation of said carrier shifting mechanism to move the carrier out of operative engagement with the reproducing mechanism.

18. In a multiple record talking machine, the combination of a rotary record support, a reproducer cooperating therewith, a magazine for supporting a plurality of records, a plurality of carriers adapted to be swung to bring a record from the magazine to the support, and from the support to the magazine, automatic means for moving the reproducer into and out of operative engagement with a record on the record support, means carried by the carrier for effecting an operation of said means to move the reproducer out of engagement with the record, and means carried by the record carrier for engaging the reproducer to simultaneously return the reproducer to the periphery of the rotary record support when the record carrier is moved from the magazine onto the rotary record support.

19. In an automatic talking machine, the combination of a sound reproducing mechanism and a record supplying and removing mechanism therefor, the reproducing mechanism including a rotary record support and a movable sound reproducer, means whereby the record supplying mechanism operates to move the reproducer into a position adjacent the periphery of the rotary record support, means for lowering and elevating the reproducer to and from operative engagement with a record on the rotary record support, means to actuate the reproducer elevating means controlled by the reproducer and operative to effect an operation of said record removing means while the elevating means retains the reproducer in elevated position.

20. In an automatic talking machine, the combination of a sound reproducing mechanism and a record supplying and removing mechanism therefor, the reproducing mechanism including a rotary record support and a movable sound reproducer, means for raising and lowering the reproducer to and from operative position with the record support, means carried by said last mentioned means for effecting an operation of the record removing mechanism actuated by the reproducer, means whereby said record supplying mechanism operates to return the reproducer to the periphery of the rotary record support, and means to reset the means for effecting the operation of the record removing mechanism.

21. In a talking machine, a magazine adapted to support a series of records for a reproducing mechanism, a plurality of record carriers in said magazine, means for engaging one of said carriers to move the same from the magazine to the reproducing mechanism and means in said magazine and on said carriers for locking the other carriers against movement away from the magazine.

22. In a talking machine, a magazine for automatically supplying records to a reproducing mechanism, a plurality of record carriers in the magazine, means for engaging a selected carrier to move the same from the magazine into operative position on the reproducing mechanism, and return the same to the magazine, means in said magazine and on said carriers to lock the other record carriers within the magazine and means to automatically shift the magazine to bring a different record carrier into selective position to be engaged by the record carrier moving means.

23. In a talking machine, a sound reproducing mechanism and a magazine for holding a plurality of sound records adapted to be automatically supplied thereto, a plurality of carriers adapted to be swung from the magazine to the sound reproducing mechanism, automatic means to shift the magazine to bring a different carrier into swinging position, means to retain said magazine in position for one of said carriers to be swung from the magazine and automatic means to release said retaining means to permit the magazine to be automatically shifted to bring another record carrier in position to be swung into playing position on the sound reproducing mechanism.

24. In a talking machine, the combination of a sound reproducing mechanism and a magazine for supporting a series of record carriers, means to automatically swing a record carrier from the magazine to the reproducing mechanism and return the same to the magazine, normally restrained means tending to bodily move the magazine to bring another carrier of the series into engaging position with the swinging means, and means controlled through the swinging mechanism for releasing said normally restrained means.

25. In a talking machine, a sound reproducing mechanism and a magazine supporting a plurality of individual record carriers, automatically operated means for shifting a record carrier and record from the magazine to the sound reproducing mechanism and returning the same to the magazine, spring means normally acting to move the magazine to bring another record carrier into engagement with said shifting means, means for normally retaining said magazine moving means inoperative, and means operative to release and then reset said retaining means.

26. In a talking machine, the combination of a sound reproducing mechanism and a magazine supporting a plurality of record carriers, means to engage and swing a carrier back and forth between the magazine and sound reproducing mechanism, a spring member tending to move the magazine in one direction to bring a new record carrier into position to be engaged by the swinging means and means to prevent the movement of said magazine in the opposite direction and to retain the magazine in proper position to permit a carrier therein to be engaged by the swinging means.

27. In a talking machine, the combination of a sound reproducing mechanism and a magazine supporting a plurality of record carriers, means to engage and swing a carrier back and forth between the magazine and sound reproducing mechanism, means to control the operation of said swinging means, means to move the magazine in one direction to bring a new record carrier into position to be engaged by the swinging means and means to prevent the movement of said magazine in the opposite direction and to retain the magazine in proper position to permit a carrier therein to be engaged by the swinging means, said retaining means also adapted to operate to release said controlling means.

28. In a magazine for holding and supplying a series of records to an automatic talking machine, the combination of a motor for moving the magazine periodically for a predetermined distance, and means for returning the magazine in initial position and for restoring the energy in said magazine moving motor.

29. In an automatic talking machine, the combination of a sound reproducing mechanism and an electric motor for operating the same, a record supplying and removing mechanism therefor and an electric motor for operating said mechanism, an electric circuit for supplying current to each of said motors and an automatically controlled switch mechanism in said circuit adapted to make and break the circuits to said motors in periodic sequence so that the motor for operating the record supplying mechanism is first operated to supply a record to the reproducing mechanism and then stopped and the reproducing mechanism operating motor started and after reproducing the record is automatically stopped and the record supplying and removing motor again operated to remove the record from the reproducing mechanism.

30. In an automatic talking machine, the combination of a sound reproducing mechanism and a record supplying and removing mechanism, an electric motor for operating each of said mechanisms, an automatically operated switch for controlling the operation of said motors, means for operating said switch and means connected with one of said motors for automatically re-energizing said switch operating means as the same is deenergized.

31. In an automatic talking machine, the combination of a sound reproducing mechanism, a motor therefor, a magazine for holding a plurality of records, a record supplying and removing mechanism, a motor therefor, a motor for bodily moving said magazine, controlling means for said motors, and means for actuating said controlling means whereby a record is transferred to the reproducing mechanism, the reproducing mechanism operated, the record returned, and the magazine bodily moved a predetermined distance, to bring another record into operative position to be supplied to the sound reproducing mechanism.

32. In an automatic talking machine, a sound reproducing mechanism and a record supplying magazine therefor, automatically operated means for moving said magazine, manually operated means for moving the magazine and a safety mechanism operative to lock the automatic means against automatic movement when the magazine is being operated manually.

33. In an automatic talking machine, a sound reproducing mechanism and a sound record supplying mechanism comprising a magazine, adapted to receive a plurality of records, automatic means for moving said magazine a predetermined distance, manually operated means for moving said magazine when said automatic means is disengaged, means operative to lock said automatic means when said manually actuated means is operated and means to lock said manually operated means against movement when said automatic means is operatively connected to the magazine.

34. In an automatic talking machine, a sound reproducing mechanism and a sound record supplying mechanism therefor, including a magazine adapted to receive a plurality of records, disengageable means for automatically moving said magazine, means for manually moving said magazine when said automatic means is disengaged, and movable means for locking said automatic magazine moving means out of engagement when the other means is in position to move the magazine.

35. In an automatic talking machine, a sound reproducing mechanism comprising a rotary record support and a sound reproducer, a record supplying and removing mechanism therefor, means to move said reproducer into and out of operative engagement with the record on the record support, motor actuated means for operating said last mentioned means, means automatically controlled by the reproducer for starting said motor actuating means to move the reproducer out of operative engagement with the record on the record support, and means controlled by the record supplying and removing mechanism for effecting an operation of said motor actuated means to move said reproducer into operative engagement with the record on the record support.

36. In an automatic talking machine, the combination of a sound reproducing mechanism comprising a rotary record support, a sound reproducer and a record supplying and removing mechanism therefor, means carried by the record supplying mechanism for moving the reproducer to the periphery of the record on the rotary record support, and means for lowering the same into operative position therewith, and means controlled by the reproducer to actuate the means for moving the reproducer out of operative engagement with the record support and throwing into operation the record returning mechanism.

37. In an automatic talking machine, the combination of a sound reproducing mechanism, a record supplying and removing mechanism, including a plurality of individual record carriers adapted to be swung into and out of position in the sound reproducing mechanism, each of said carriers comprising a curved portion provided with an extension forming a pivot for the carrier, said extension being provided with means adapted to be detachably connected with the carrier swinging means and with means adapted to interlock with a fixed part of said magazine whereby the lateral movement of said carrier may be prevented.

38. In an automatic talking machine, a sound reproducing mechanism comprising a rotary record support and a sound reproducer, mechanism for supplying and removing a record to and from said reproducing mechanism, means for raising and lowering the reproducer into and from operative engagement with the record on the record support, and means carried by the last mentioned means for controlling the operation of said record removing means.

39. In an automatic talking machine, the combination of a sound reproducing mechanism, including a rotary record support and a sound reproducer, a record supplying and removing mechanism, including a plurality of carriers adapted to be moved to carry a record into and out of operative engagement with the sound reproducing mechanism, means for raising and lowering the reproducer from operative engagement with the record on the record support including an element movable with the reproducer, and releasable and resettable means carried thereby for effecting an operation of the record removing means when the reproducer reaches the end of the record on the record support.

40. In an automatic talking machine, a sound reproducing mechanism, including a rotatable record support, a magazine for holding a plurality of records, means to move a record from the magazine to the support and return the same to the magazine including a crank member, means for moving the magazine, mechanism for controlling the cycle of operations of the machine, a releasable member controlling the mechanism, said crank member being provided with a plurality of members adapted to move said releasable controlling member through a path of movement of different lengths whereby when the releasable member is moved by one of said crank members, the controlling mechanism operates to shut off the record moving means and effect an operation of the magazine moving means and when operated by the other of said members to effect a rotation of said record support of the reproducing mechanism.

41. In an automatic talking machine for playing a series of records, an electrically operated reproducing mechanism, a plurality of record carriers electrically operated to transfer a record to and from the reproducing mechanism, automatic means to control the operation of said electrically operated means in periodic sequence, manually operable means to start and stop the machine and automatically operated means to stop the mechanism when all of the records have been played.

42. In an automatic talking machine, a turn-table, a record magazine, a plurality of record carriers each adapted to support a record located therein, means to pivotally secure a record to said carrier, means to swing a record carrier back and forth between the magazine and turntable, means to form a guiding and supporting surface for said record and carrier during movement between the magazine and turntable and means engaging the carrier when located over the turntable adapted to cooperate with the guiding surface to hold the carrier with the record positioned coaxially with respect to said turntable and, engaging the surface thereof.

43. In a sound reproducing mechanism, the combination with a rotatable record support and a reproducing mechanism, of means for holding a series of record carriers and a series of records, each carrier of said series of carriers being adapted to individually hold a record of said series of records, oscillatory means adapted to be automatically operated to successively swing said carriers and said records from the series in said first-mentioned means to the rotatable record support and to return the same to said series in said first-mentioned means, means on said reproducing mechanism and on each of said carriers whereby the oscillatory means operates to return the record on said rotatable record support to the series in said first-mentioned means when the reproducing mechanism arrives adjacent the center of the record on said rotatable record support and means on the succeeding carriers of the series adapted, as a succeeding carrier swings a succeeding record to said rotatable support into playing position, to return said reproducing mechanism adjacent the periphery of said succeeding record.

44. In a talking machine comprising a rotatable record support, a sound reproducing mechanism, a magazine adapted to contain a series of record carriers, one for each record, and means automatically operated to move a selected carrier and the record carried thereby from said magazine and to place the record carried thereby on said rotatable record support, the combination of a sound box or reproducer and means mounted on each carrier to engage said reproducer and to position said reproducer in registration with the beginning of the sound record groove as said record carrier moves from said magazine to said record support.

45. In a talking machine comprising a rotatable record support, a sound reproducing mechanism, a magazine adapted to contain a series of record carriers, a record in each carrier, and means to automatically move a selected carrier and record from said magazine to said record support and to place said record on said rotatable record support, the combination of a sound box or reproducer and means mounted on each carrier and adjustable with respect to the particular record carried thereby to position the reproducer in registration with the beginning of the sound record groove during the movement of said record carrier from said magazine to said record support.

46. In a sound reproducing machine comprising a rotatable record support, a sound reproducing mechanism, a magazine, a series of record carriers, each carrier being adapted to hold a single record, and automatic means to move a carrier and a record carried thereby from said record support back to said magazine, the combination of a sound box or reproducer, means to remove said reproducer from engagement with said record, and means on said carrier to actuate or put in motion said mechanism to remove said reproducer from the record when the reproduction of sound from said record is completed, and to put in motion said means for returning to said magazine said carrier and the record carried thereby.

47. In a sound reproducing machine comprising a rotatable record support, a sound reproducing mechanism, a magazine, a series of record carriers, each carrier being adapted to hold a single record, and automatic means to move a carrier and a record carried thereby from said record support back to said magazine, the combination of a sound box or reproducer, means to remove said reproducer from engagement with said record, and means on said carrier and adjustable to the particular record carried thereby, to actuate or put in motion said mechanism to remove said reproducer from the record when the reproduction of sound from said record is completed, and to put in motion said means for returning to said magazine said carrier and the record carried thereby.

In witness whereof, I have hereunto set my hand this 13th day of September, 1917.

LLOYD Y. SQUIBB.

Certificate of Correction.

It is hereby certified that in Letters Patent No. 1,433,103, granted October 24, 1922, upon the application of Lloyd Y. Squibb, of Camden, New Jersey, for an improvement in "Automatic Talking Machines," errors appear in the printed specification requiring correction as follows: Page 7, line 21, for the word "slip" read *clip;* page 10, line 94, claim 5, after the word "series" strike out the comma, and line 95, after the word "carriers" insert a comma and the word , *comprising;* and that the said Letters Patent should be read with these corrections therein that the same may conform to the record of the case in the Patent Office.

Signed and sealed this 5th day of December, A. D., 1922.

[SEAL.]

KARL FENNING,
*Acting Commissioner of Patents.*